United States Patent
Sykora et al.

(10) Patent No.: US 8,285,341 B2
(45) Date of Patent: Oct. 9, 2012

(54) PROCESS FOR TRANSMITTING PHONE BOOK DATA FROM A MOBILE TELEPHONE TO AN EXTERNAL DEVICE AND AN EXTERNAL DEVICE

(75) Inventors: Thomas Sykora, Munich (DE); Axel Nitsche, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 12/470,136

(22) Filed: May 21, 2009

(65) Prior Publication Data

US 2009/0280746 A1 Nov. 12, 2009

Related U.S. Application Data

(63) Continuation of application No. PCT/EP2007/009747, filed on Nov. 10, 2007.

(30) Foreign Application Priority Data

Nov. 24, 2006 (DE) .......................... 10 2006 055 501

(51) Int. Cl.
*H04M 1/00* (2006.01)
*H04B 7/00* (2006.01)
(52) U.S. Cl. ................... 455/569.1; 455/569.2; 455/551; 455/556.1; 455/556.2; 455/41.1; 455/41.2; 455/41.3
(58) Field of Classification Search ............ 455/41.1, 455/41.2, 41.3, 556.1, 556.2, 551, 569.1
See application file for complete search history.

(56) References Cited

U.S. PATENT DOCUMENTS

| | | | | |
|---|---|---|---|---|
| 7,715,791 | B2* | 5/2010 | Matsuda | 455/41.2 |
| 7,756,474 | B2* | 7/2010 | Watanabe et al. | 455/41.2 |
| 2005/0097566 | A1* | 5/2005 | Watts et al. | 719/313 |
| 2005/0197061 | A1 | 9/2005 | Hundal | |
| 2006/0079182 | A1 | 4/2006 | Matsuda | |
| 2006/0094462 | A1 | 5/2006 | Nguyen et al. | |
| 2006/0178133 | A1* | 8/2006 | Kim | 455/412.1 |
| 2007/0282848 | A1* | 12/2007 | Kiilerich et al. | 707/10 |
| 2008/0102821 | A1* | 5/2008 | Jalon | 455/425 |

(Continued)

FOREIGN PATENT DOCUMENTS

DE   10 2005 002 574 A1   9/2005

(Continued)

OTHER PUBLICATIONS

"Enhanced profiles for In-car phone handling and mobile phones with streaming music will drive Bluetooth adoption in the car", Feb. 13, 2006, Bluetooth SIG, XP002469141 URL:http://bluetooth.com/Bluetooth/Press/SIG/Test_1.htm>.

(Continued)

*Primary Examiner* — Wen Huang
(74) *Attorney, Agent, or Firm* — Crowell & Moring LLP

(57) ABSTRACT

A process is provided for transmitting phone book data from a mobile telephone to an external device, wherein a Bluetooth communication channel is established between the mobile telephone and the external device. Based on the Bluetooth communication channel, as the first Bluetooth service, a Bluetooth telephony service is established. A transmission of phone book data from the mobile phone to the external device is initiated based on one of at least two predetermined manners of access.

16 Claims, 2 Drawing Sheets

U.S. PATENT DOCUMENTS

2009/0011799 A1* 1/2009 Douthitt et al. ............ 455/569.1

FOREIGN PATENT DOCUMENTS

WO     WO 2006/074345 A1     7/2006

OTHER PUBLICATIONS

Oliver Zechlin, "Nutzung des SIM Access Profiles zur Uebertragung des Mobilfunkadressbuches an ein Bluetooth-CarKit", IP.Com Journal, IP.Com Inc., West Henrietta, NY, Feb. 25, 2005, XP013022983.

Hands-free profile 1.5, Nov. 25, 2005, pp. 1-93 XP002469143 URL:http://www.bluetooth.com/NR/rdonlyres/7EC6A8DC-D570-4FA1-A970-275223A8A72B/1762/HFP15_SPEC_V10r01.htmf>.

"Bluetooth SIG launches new Profiles" [Online] Feb. 14, 2006, XP002469142 URL: http://www.autoindustry.co.uk/news/14-02-06 6>.

International Search Report dated Feb. 26, 2008 w/English translation (six (6) pages).

German Search Report dated Sep. 28, 2007 w/English translation (nine (9) pages).

* cited by examiner

PROCESS FOR TRANSMITTING PHONE BOOK DATA FROM A MOBILE TELEPHONE TO AN EXTERNAL DEVICE AND AN EXTERNAL DEVICE

CROSS-REFERENCE TO RELATED APPLICATIONS

This application is a continuation of PCT International Application No. PCT/EP2007/009747, filed Nov. 10, 2007, which claims priority under 35 U.S.C. §119 to German Patent Application No. DE 10 2006 055 501.5, filed Nov. 24, 2006, the entire disclosures of which are herein expressly incorporated by reference.

BACKGROUND AND SUMMARY OF THE INVENTION

The invention relates to a process for transmitting phone book data from a mobile telephone to an external device and to the correspondingly equipped external device, particularly a hands-free telephone device of a motor vehicle or a control device in a motor vehicle.

In recent years, the continued rapid spread of mobile communication technology has resulted in, among other things, the development and availability of motor vehicle hands-free telephone devices which interact with mobile telephones. In this case, hands-free telephone devices of motor vehicles are considered to be particularly advanced which interact and communicate in a cordless manner, especially based on the so-called Bluetooth standard, with a mobile telephone situated particularly in the vehicle or in the proximity of the vehicle.

For this purpose, it is known that a hands-free telephone device of a motor vehicle automatically establishes a Bluetooth connection to a mobile telephone assigned to the hands-free telephone device of the motor vehicle or vice versa, as soon as the mobile telephone is within the range of the motor vehicle hands-free telephone device or vice-versa. The mobile telephone and the motor vehicle hands-free telephone device can then exchange data by way of the Bluetooth connection. By the exchange of voice data, the voice communication based on the motor vehicle hands-free telephone device and the mobile telephone can then be implemented by way of a mobile communication system. By the exchange of control data, the control of the mobile telephone can be implemented by way of a user interface of a motor vehicle.

A special manner of accessing electronic phone books of mobile telephones via a hands-free telephone device of a motor vehicle and their subsequent processing is known from WO 2006074345 A1. In the case of such an access, compatibility problems may still occur which, at least partly, can be eliminated by means of the interface description, the so-called Phone Book Access Profile PBAP, has recently been provided by the Bluetooth Special Interest Group (SIG). However, for an implementation of the PBAP in motor vehicle hands-free telephone devices, it has to be taken into account that the motor vehicle hands-free telephone devices can continue to also access electronic phone books of mobile telephones, which do not yet have an implementation of the PBAP.

There is therefore needed an improved process and device for interacting between a mobile telephone and an external device, such as a hands-free telephone device of a motor vehicle.

This and other needs are met by a process for transmitting phone book data from a mobile telephone to an external device, wherein a Bluetooth communication channel (RF-COMM) is established between the mobile telephone and the external device. Based on the Bluetooth communication channel (RF-COMM), as the first Bluetooth service, a Bluetooth telephony service (HFP) is established, and a transmission of phone book data from the mobile phone to the external device is initiated based on one of at least two predetermined manners of access (PBAP, ATC). Advantageous further developments of the invention are described herein.

The invention is based on the following recognitions:

(1) there are mobile telephones having a Bluetooth interface (single channel) which are incapable of implementing more than one Bluetooth service by way of a Bluetooth communication channel;

(2) there are mobile telephones having a Bluetooth interface (multi-channel) which are capable of implementing more than one Bluetooth service by way of a Bluetooth communication channel;

(3) there are mobile telephones having a Bluetooth interface whose phone book data can be accessed based on a first manner of access, particularly a mobile-telephone-type-specific manner of access and/or a manner of access using AT commands (the AT commands, for example, are implemented as specified by the mobile telephone manufacturer);

(4) there are mobile telephones having a Bluetooth interface whose phone book data can be accessed based on a second manner of access, particularly a Bluetooth-specific manner of access;

(5) there are mobile telephones having a Bluetooth interface whose phone book data can be accessed based on a first manner of access, particularly a mobile-telephone-type-specific manner of access and/or a manner of access using AT commands, or based on a second manner of access, particularly a Bluetooth-specific manner of access;

(6) the implementation of the second manner of access is based on a Bluetooth service, is a Bluetooth service, or requires its own Bluetooth service; and (7) the implementation of a Bluetooth telephony service is based on a Bluetooth service, is a Bluetooth service, or requires its own Bluetooth service.

While utilizing and linking these recognitions, the invention is now particularly based on the idea of permitting a mobile telephone user in a vehicle having a hands-free telephone device to reliably and rapidly telephone in high-priority cases and of permitting access to phone book data by way of the hands-free telephone device in low-priority cases. This is preferably achieved in that, independently of the capabilities of the mobile telephone, after the establishment of a Bluetooth communication channel (RF-COMM) between the mobile telephone and an external device, particularly a hands-free telephone device, based on the Bluetooth communication channel (RF-COMM), a Bluetooth telephony service (HFP; Bluetooth Hands-Free Profile) is established as a first Bluetooth service, particularly for the call handling. This ensures that, independently of the capabilities of the mobile telephone, a call with the mobile telephone by way of an external device, particularly a hands-free telephone device, becomes possible in a rapid and reliable manner.

In order to now, also independently of the capabilities of the mobile telephone, rapidly and reliably permit access to phone book data of the mobile telephone by way of an external device, particularly a hands-free telephone device, preferably a transmission of phone book data from the mobile telephone to the external device is initiated based on one of at least two predetermined manners of access (PBAP, Phone Book Access Profile; ATC, AT Commands). In this case, preferably, the first manner of access (ATC) can be implemented based on the Bluetooth telephony service (HFP), and the second manner of access (PBAP) can be implemented based on a second Bluetooth Service or as a second Bluetooth service (PBAP). As a result, it is ensured that phone book data of different types of mobile telephones can be rapidly and reliably accessed irrespective of whether the Bluetooth interface of the mobile telephone type allows or governs the access based on a first manner of access, on a second manner of access, or on both manners of access.

A preferred embodiment provides that, based on the Bluetooth telephony service (HFP), first a transmission of phone book data based on a first manner of access (ATC) is initiated from the mobile telephone to the external device, particularly subsequent to a successful establishment of the Bluetooth telephony service (HFP). In this case, the first manner of access is preferably implemented specifically with respect to the mobile telephone type and/or is based on AT commands.

As a result, after the prioritized implementation of a telephony service, phone book data of different mobile telephone types whose Bluetooth interface is compatible with the first manner of access (ATC), can be reliably accessed in a proven and frequently tested manner, in particular, based on AT commands.

Preferably, it is only attempted to establish a second Bluetooth service based on the Bluetooth communication channel (RF-COMM) when a transmission of phone book data based on a first manner of access (ATC) from the mobile telephone to the external device fails. This second Bluetooth service, which can be established particularly in the case of multi-channel-capable mobile telephones, will then preferably be utilized for the transmission of phone book data from the mobile telephone to the external device. Particularly in this case, a transmission of phone book data from the mobile telephone to the external device based on a second manner of access (PBAP) will be initiated when the attempt to establish a second Bluetooth service based on the Bluetooth communication channel (RF-COMM) is successful. In this case, the second manner of access (PBAP) can use or determine the second Bluetooth service. For example, the second manner of access (PBAP) may also be the second Bluetooth service, and the attempt to establish a second Bluetooth service based on the Bluetooth communication channel (RF-COMM) may be an attempt to, based on the Bluetooth communication channel (RF-COMM), initiate a transmission of phone book data from the mobile telephone to the external device based on the second manner of access (PBAP).

As a result, it is achieved that also phone book data of mobile telephones can be accessed whose Bluetooth interface is compatible with the second manner of access (PBAP) but is not compatible with the first a manner of access (ATC), The previous further developments of the invention assume in particular that the phone book data are accessed preferably by way of the first manner of access. This is particularly advantageous when it is assumed that a large number of the used mobile telephones are compatible with the first, particularly the conventional, manner of access, and/or that the first manner of access is more reliable because it has, for example, been available longer or has been subjected to a large numbers of tests and checks. The assumption that a large number of the used mobile telephones are single-channel-capable with respect to the Bluetooth interface also speaks for the use of one of the previously mentioned further developments.

In contrast, if it is assumed that a large number of the used mobile telephones are multi-channel-capable with respect to the Bluetooth interface and compatible with the second manner of access, and/or that the second manner of access operates more reliably or comprehensively because it is based, for example, on a standard that is independent of the manufacturer, one of the following further developments will be particularly advantageous.

In this case, without first using the first manner of access, it is preferably attempted to establish a second Bluetooth service based on the Bluetooth communication channel (RF-COMM). A transmission of phone book data from the mobile telephone to the external device is initiated based on a second manner of access (PBAP) if the attempt at establishing a second Bluetooth service based on the Bluetooth communication channel (RF-COMM) is successful, in which case the second manner of access (PBAP) uses or determines the second Bluetooth service. For example, the second manner of access (PBAP) may also again be the second Bluetooth service, and the attempt to, based on the Bluetooth communication channel (RF-COMM), establish a second Bluetooth service, may be an attempt to, based on the Bluetooth communication channel (RF-COMM), initiate a transmission of phone book data from the mobile telephone to the external device based on the second manner of access (PBAP).

Particularly preferably, it is provided that a transmission of phone book data from the mobile telephone to the external device is initiated based on a first manner of access (ATC) if the attempt to establish a second Bluetooth service based on the Bluetooth communication channel (RF-COMM) is not successful, or if a transmission of phone book data from the mobile telephone to the external device based on a second manner of access (PBAP) is not successful. In this case, the transmission of phone book data based on a first manner of access (ATC) from the mobile telephone to the external device is preferably based on the Bluetooth telephony service (HFP).

As a result, phone book data of mobile telephones can also be accessed which cannot be accessed by way of the second manner of access.

The above-mentioned object is also achieved by an external device, particularly a hands-free telephone device of a motor vehicle, or a control device in a motor vehicle, having a Bluetooth transmission device which is equipped for the alternative access to phone book data from a mobile telephone in one of at least two different predetermined manners of access (PBAP, ATC). A control device is equipped such that a Bluetooth communication channel (RF-COMM) between the mobile telephone and the external device is established, that, based on the Bluetooth communication channel (RF-COMM), a Bluetooth telephony service is established as a first Bluetooth service, and that a transmission of phone book data from the mobile telephone to the external device is initiated based on one of at least two predetermined manners of access (PBAP, ATC).

The control device may be constructed as a program-controlled processor device or as an application-specific integrated circuit. The control device is equipped correspondingly in a program-related manner, particularly for controlling essential components of the external device and for controlling or implementing the steps of the process within the scope of the invention.

Within the course of time, the two above-mentioned types of preferred further developments (preferred use of the first manner of access and preferred use of the second manner of access) may prove to be more or less advantageous. This depends on the not exactly predictable Bluetooth equipment of future types of mobile telephones. However, since the innovation and model cycles in the mobile telephone field are considerably shorter than, for example, in the field of motor vehicle hands-free telephone devices, a preferred embodiment of the invention provides that the external device is equipped such that, as a function of a coding bit in a memory device of the external device, which coding bit can be adjusted from the outside, different processes according to the invention may be carried out, thus preferably the first manner of access or preferably the second manner of access is used and tested. As a result, for example, a motor vehicle hands-free telephone device installed in a motor vehicle can be adapted later at low expenditures to the developments on the mobile telephone market at that time.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
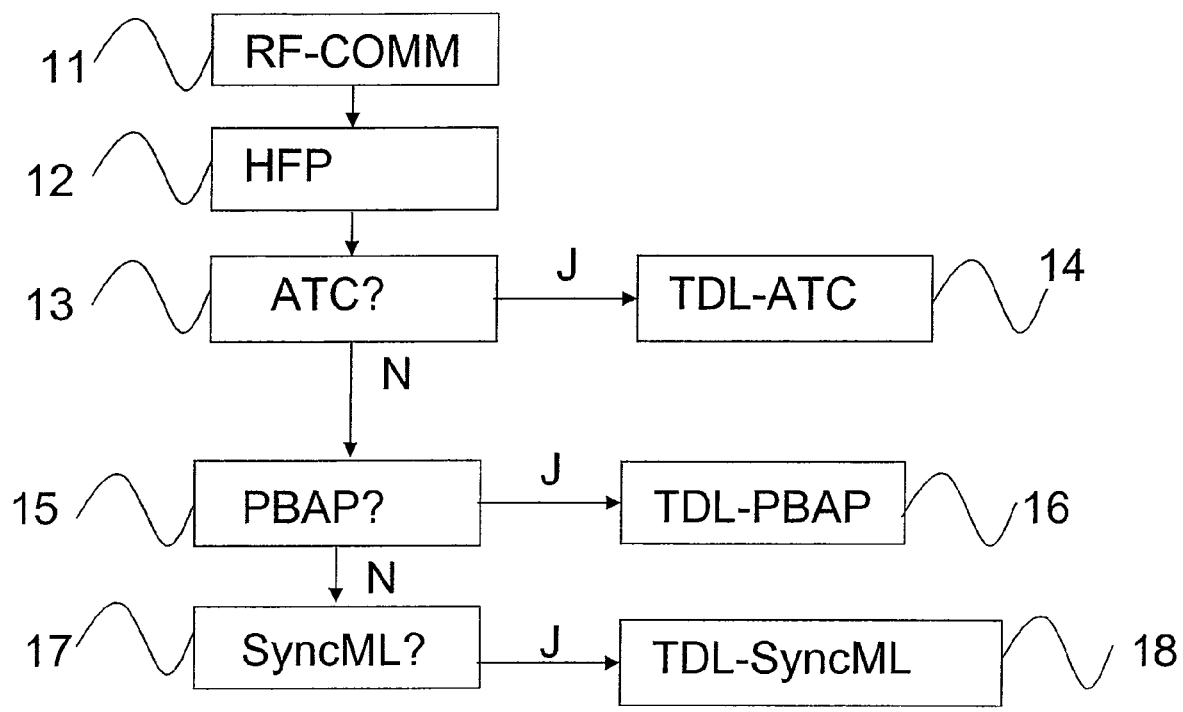
FIG. 1 is a first simplified flow chart of a process for the transmission of phone book data from a mobile telephone to an external device.

FIG. 1 illustrates the course of a phone book download from a mobile telephone to a motor vehicle hands-free telephone device, wherein first a phone book download is attempted based on AT commands (first manner of access), and then, particularly when the first attempt fails, a phone book download is attempted based on the standardized, so-called Phone Book Access Profile PBAP (second manner of access).

In a first step, which is not shown, while the motor vehicle hands-free telephone device, which has a Bluetooth transmission device and a control device, is in a switched-on condition, a mobile telephone assigned to the motor vehicle hands-free telephone device will be switched on, which mobile telephone is within the range of the motor vehicle hands-free telephone device.

After suitable synchronization and identification steps, a Bluetooth communication channel RF-COMM between the mobile telephone and the external device is automatically established in a second Step 11.

In a third Step 12, a Bluetooth telephony service, the so-called Bluetooth Hands-Free Profile HFP, is established based on the Bluetooth communication channel RF-COMM as a first Bluetooth service.

In a fourth Step 13, it is attempted (ATC), particularly by using the Bluetooth telephony service HFP, to initiate or to implement access to phone book data based on AT commands. If this attempt is successful, phone book data will be transmitted in a further Step 14 from the mobile telephone to the external device based on AT commands (TDL-ATC). Should this attempt not be successful, it will be attempted in a further Step 15 (PBAP) to establish or to use the Phone Book Access Profile PBAP as a second Bluetooth service based on the Bluetooth communication channel (RF-COMM). If this attempt is successful, in a further Step 16, phone book data based on the Phone Book Access Profile PBAP will be transmitted from the mobile telephone to the external device (TDL-PBAP). Should this attempt not be successful, it will be attempted in further Steps 17, 18 (SyncML), based on the so-called Synchronization Markup Language (SyncML), to transmit phone book data from the mobile telephone to the external device (TDL-SyncML).

Figure 2:
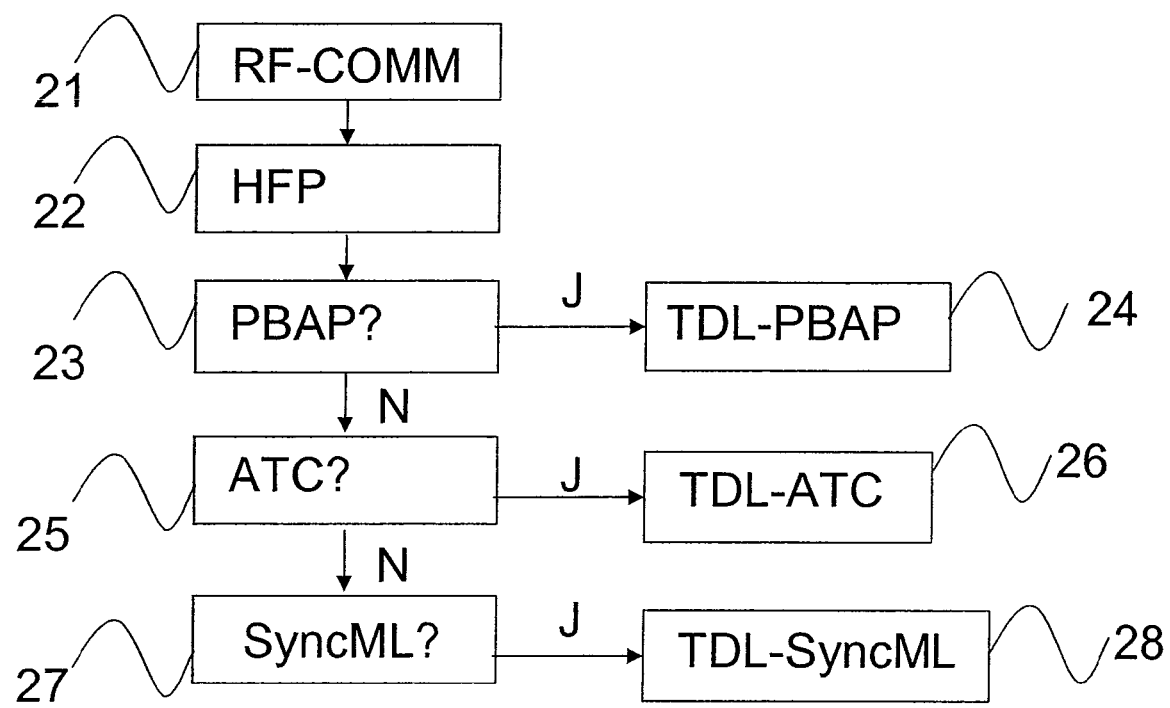
FIG. 2 is a second simplified flow chart of a process for the transmission of phone book data from a mobile telephone to an external device.

FIG. 2 illustrates the course of a phone book download from a mobile telephone to a motor vehicle hands-free telephone device, wherein first a phone book download is attempted based on the standardized so-called Phone Book Access Profile PBAP (second manner of access), and then, particularly when the first attempt fails, a phone book download is attempted based on AT commands (first manner of access).

In a first step, which is not shown, when the motor vehicle hands-free telephone device is in a switched-on condition, a mobile telephone is switched on again which is assigned to the motor vehicle hands-free telephone device.

After suitable synchronization and identification steps, a Bluetooth communication channel RF-COMM between the mobile telephone and the external device is automatically established in a second Step 21.

In a third Step 22, a Bluetooth telephony service, the so-called Bluetooth Hands-Free Profile HFP, is established based on the Bluetooth communication channel RF-COMM as a first Bluetooth service.

In a fourth Step 23, it is attempted (PBAP), to establish or to use the Phone Book Access Profile PBAP based on the Bluetooth communication channel (RF-COMM) as the second Bluetooth service. If this attempt is successful, phone book data will be transmitted in a further Step 24 from the mobile telephone to the external device based on the Phone Book Access Profile PBAP (TDL-PBAP). Should this attempt not be successful, it will be attempted in a further Step 25 (ATC) to initiate or to implement, particularly by using the Bluetooth telephony service HFP, access to phone book data based on AT commands. If this attempt is successful, in a further Step 26, phone book data based on AT commands will be transmitted from the mobile telephone to the external device (TDL-ATC). Should this attempt not be successful, it will be attempted in further Steps 27, 28 (SyncML), based on the so-called Synchronization Markup Language (SyncML), to transmit phone book data from the mobile telephone to the external device (TDL-SyncML).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for transmitting phone book data from a mobile telephone to an external device, the process comprising the acts of:

establishing a Bluetooth communication channel between the mobile telephone and the external device;

establishing a Bluetooth telephony service as a first Bluetooth service based on the Bluetooth communication channel;

determining a first type of access, from at least two predetermined manners of Bluetooth access, to use in a first attempted transmission of phone book data without checking whether said mobile phone is compatible with the first type of access;

initiating the first attempted transmission of phone book data from the mobile phone to the external device based on the first type of access, and initiating, in the event the first attempted transmission fails, a second attempted transmission of the phone book data from the mobile phone to the external device based on a second type of access from the at least two predetermined manners.

2. The process according to claim 1, wherein, when the second attempted transmission is successful, initiating the transmission of phone book data from the mobile telephone to the external device based on the second type of access, the second type of access using or determining a second Bluetooth service.

3. The process according to claim 1, wherein the first type of access from the mobile telephone to the external device is based on the Bluetooth telephony service.

4. The process according to claim 1, further comprising adjusting a coding bit to allow for different processes for transmitting phone book data from a mobile telephone to the external device to be implemented.

5. The process according to claim 1, wherein the first Bluetooth service is Bluetooth Hands-Free Profile.

6. The process according to claim 1, wherein the at least two predetermined manners of Bluetooth access include Phone Book Access Profile and AT Commands.

7. The process according to claim 1, wherein determining the first type of access comprises determining the first type of access from at least two predetermined manners of Bluetooth access based on a coding bit in a memory of the external device, and without regard to whether the mobile phone is compatible with the first type of access.

8. An external device, comprising:
   a Bluetooth transmission device equipped for alternative access to phone book data of a mobile telephone in at least two different predetermined types of access; and
   a control device equipped such that a Bluetooth communication channel is establishable between the mobile telephone and the external device; and
   wherein, based on the Bluetooth communication channel, a Bluetooth telephony service is established as a first Bluetooth service and a determination of a first type of access, of at least two predetermined manners of Bluetooth access, to use in a first attempted transmission of phone book data is made without checking whether said mobile phone is compatible with said first type of access, and wherein the first attempted transmission of phone book data from the mobile telephone to the external device is initiated based on the first type of access determined from at least two predetermined types of Bluetooth access, and, in the event that the first attempted transmission fails, a second attempted transmission of the phone book data from the mobile phone to the external device is initiated based on a second type of access from the at least two predetermined manners.

9. The external device according to claim 8, wherein the external device is a motor vehicle hands-free telephone device.

10. The external device according to claim 8, further comprising an adjustable coding bit, wherein adjustment of the coding bit allows for different processes for transmitting phone book data from a mobile telephone to the external device to be implemented.

11. The external device according to claim 8, wherein, when the second attempted transmission is successful, the transmission of phone book data from the mobile telephone to the external device is initiated based on the second type of access, the second type of access using or determining a second Bluetooth service.

12. The external device according to claim 8, wherein the first Bluetooth service is Bluetooth Hands-Free Profile.

13. The external device according to claim 8, wherein the at least two predetermined manners of Bluetooth access include Phone Book Access Profile and AT Commands.

14. The external device according to claim 8, further comprising a memory, and wherein the determination of the first type of access, from at least two predetermined manners of Bluetooth access, is made based on a coding but stored in said memory, and without regard to whether the mobile phone is compatible with said first type of access.

15. A process for transmitting phone book data from a mobile telephone to an external device, the process comprising the acts of:
   establishing a Bluetooth communication channel between the mobile telephone and the external device;
   establishing a Bluetooth Hands-Free Profile as a first Bluetooth service based on the Bluetooth communication channel;
   initiating a first attempted transmission of phone book data from the mobile phone to the external device based on a first type of access without checking whether said mobile phone is compatible with the first type of access; and
   initiating, in the event the first attempted transmission fails, a second attempted transmission of the phone book data from the mobile phone to the external device based on a second type of access.

16. The process according to claim 15, wherein the first type of access is based on one of AT commands and phone book access profile (PBAP), and the second type of access is based on the other one of AT commands and PBAP.

\* \* \* \* \*